(12) United States Patent
Tassberg et al.

(10) Patent No.: US 7,088,950 B2
(45) Date of Patent: Aug. 8, 2006

(54) METHOD AND APPARATUS FOR CONTROLLING INTEGRATED RECEIVER OPERATION IN A COMMUNICATIONS TERMINAL

(75) Inventors: Markus Tassberg, Tampere (FI); Pirjo Haakana, Tampere (FI); Erkki Rysä, Tampere (FI)

(73) Assignee: Nokia Corporation, Espoo (FI)

( * ) Notice: Subject to any disclaimer, the term of this patent is extended or adjusted under 35 U.S.C. 154(b) by 322 days.

(21) Appl. No.: 10/304,555

(22) Filed: Nov. 26, 2002

(65) Prior Publication Data

US 2004/0204010 A1    Oct. 14, 2004

(51) Int. Cl.
*H04H 1/00*      (2006.01)

(52) U.S. Cl. .............. 455/3.01; 455/3.03; 455/419; 455/555; 455/556.1; 375/259; 375/316; 380/240; 380/241; 380/242; 717/176; 717/177; 717/178

(58) Field of Classification Search .............. 455/3.01, 455/3.03, 419, 556.1, 555; 375/316, 259; 380/240, 241, 242; 717/176, 177, 178
See application file for complete search history.

(56) References Cited

U.S. PATENT DOCUMENTS

| | | | | |
|---|---|---|---|---|
| 4,591,661 A | * | 5/1986 | Benedetto et al. | 455/556.1 |
| 5,953,418 A | * | 9/1999 | Bock et al. | 380/240 |
| 6,167,253 A | * | 12/2000 | Farris et al. | 455/412.2 |
| 6,289,382 B1 | * | 9/2001 | Bowman-Amuah | 709/226 |
| 6,418,310 B1 | * | 7/2002 | Dent | 455/418 |
| 2001/0031013 A1 | * | 10/2001 | Stetzler et al. | 375/259 |
| 2002/0026474 A1 | * | 2/2002 | Wang et al. | 709/203 |
| 2002/0031166 A1 | | 3/2002 | Subramanian et al. | |
| 2002/0124245 A1 | * | 9/2002 | Maddux et al. | 717/176 |
| 2002/0180798 A1 | * | 12/2002 | Poor et al. | 345/781 |

FOREIGN PATENT DOCUMENTS

| | | |
|---|---|---|
| GB | 2 332 126 A | 6/1999 |
| WO | WO 01/77779 A2 | 10/2001 |

* cited by examiner

*Primary Examiner*—Steve M. D'Agosta
(74) *Attorney, Agent, or Firm*—Hollingworth & Funk, LLC

(57) ABSTRACT

A method and apparatus for controlling integrated receiver operation in a communications terminal includes using an electronic device having a broadcast receiving module and a two-way communications module. The device may use the configuration of the receiving module to form a message to be sent to a peer device. The electronic device can use an incoming message to change a configuration of the receiving module. The incoming message may be sent from a notification node that is remotely configurable by a user. The receiving module can be controlled from an application program on the electronic device. In one aspect, the receiving module can be controlled from a Java™2 Micro Edition MIDlet.

29 Claims, 4 Drawing Sheets

METHOD AND APPARATUS FOR CONTROLLING INTEGRATED RECEIVER OPERATION IN A COMMUNICATIONS TERMINAL

FIELD OF THE INVENTION

This invention relates in general to communications devices, and more particularly to a method and apparatus for controlling integrated receiver operations in a mobile communications terminal.

BACKGROUND OF THE INVENTION

Mobile electronic devices such as cellular phones and personal digital assistants (PDAs) are becoming increasingly popular. Such devices utilize microprocessors that make them highly adaptable communications devices. Some of these devices have additional functionality that can be integrated or added through expansion ports.

One type of useful functionality that can be added to electronic communications devices is the reception of wireless broadcast signals such as radio or television signals. Even with the growth of the Internet and other digital technologies, wireless broadcast communications are still widely used. Therefore it is beneficial to add such functionality to two-way communications devices to enhance their usefulness.

In order for mobile communications devices to be desirable replacements for existing stand-alone receivers, the communications devices must not only provide replacement functionality, but must provide additional benefits to the user that justifies the additional costs of including such features. Adding rich features to mobile communications devices is possible due to the programmable nature of the device, although there are inherent limits in such devices.

Mobile devices have much stricter power consumption limitations than other electronic devices; therefore the processors and memory on these devices are necessarily limited. For this reason, software on mobile devices (especially telephones) is often specially written for the target hardware to enhance performance and reduce memory usage. The disadvantage to this specialization is that it is more difficult to add functionality in the form of additional programs, particularly programs that should be able to run on a wide range of devices.

What is needed is a way to add new functionality to a broadcast receiver module on a mobile communications device. Further, such functionality should be able to run on a wide variety of devices to enhance compatibility and acceptance among users. The present invention fulfills these and other needs, and offers other advantages over prior art approaches.

SUMMARY OF THE INVENTION

To overcome limitations in the prior art described above, and to overcome other limitations that will become apparent upon reading and understanding the present specification, the present invention discloses a method and apparatus for controlling an integrated receiving module in a portable communications device.

In accordance with one embodiment of the invention, a method is provided for controlling a broadcast receiving module on a communications device. The method involves retrieving an operational configuration of the receiving module to determine a state of the receiving module. The retrieved operational configuration is applied as input to an application program running in a virtual machine on the communications device. A user input is applied to the application program to create a changed configuration which is then applied to the receiving module to change a state of the receiving module.

The method may involve creating a message from the retrieved operational configuration of the receiving module, and then sending the message over a communications link of the communications device. In another aspect, the method involves receiving a message containing a modified configuration of the receiving module from a communications link of the communications device and applying the modified configuration as input to the application program to change the state of the receiving module.

The method may involve retrieving a decoded message from the broadcast as input to the application program. The decoded message can be shown in a display of the communications device or stored in a data storage module of the communications device.

The virtual machine of the communications device may include a Java virtual machine, and the application program can include a J2ME MIDlet. In one aspect of the method, changing a state of the receiving module comprises changing at least one of a frequency, a modulation format, and an on-off state.

In accordance within another embodiment of the present invention, a method for controlling a broadcast receiving module on a communications device, involves receiving a message containing a configuration of the receiving module from a communications link of the communications device. The configuration is retrieved from the message to form a changed configuration of the receiving module. The changed configuration is applied to the receiving module to change a state of the receiving module.

In one aspect, the method further involves retrieving an operational parameter of the receiving module to determine a state of the receiving module. A message is created from the retrieved operational parameter of the receiving module and the message is sent over the communications link of the communications device. A user of the communications device may be alerted to confirm the changed configuration before changing the state of the receiving module.

In another embodiment of the present invention, a system of providing a broadcast notification service includes at least one electronic device and a notification node. The electronic device includes a receiving module for receiving a broadcast signal and a communications module providing two-way communications. The notification node includes a server module for allowing the selection of a predetermined notification event and a communications module to send the notification event to the communication module of the electronic device. The electronic device is configured to change a configuration of the receiving module in response to the predetermined notification event.

In one arrangement, the electronic device is configured to access the server module of the notification node to select the notification event. The electronic device may also be configured to send out a message comprising a configuration of the receiving module in response to a user request.

In another aspect of the invention, the electronic device includes at least one of a wireline computing device, a wireless computing device, and a wireless communication device. The wireless communication device may include a wireless telephone or a personal digital assistant (PDA). The receiving module may include a radio receiver or a television receiver.

In another embodiment of the present invention, a system of providing a broadcast notification service includes a first and second electronic device. Each device includes a receiving module for receiving a broadcast signal and a communications module for providing two-way communications. The first electronic device is configured to retrieve a configuration of the receiving module of the first electronic device in response to a user input and send a message comprising the configuration from the communications module of the first electronic device. The second electronic device is configured to receive the message sent from the first electronic device at the communications module of the second device. The second device retrieves the configuration from the message to form a changed configuration and applies the changed configuration to change a state of the receiving module of the second electronic device.

The first and second electronic devices may each include at least one of a wireline computing device, a wireless computing device, and a wireless communication device. The wireless communication device may include a wireless telephone or a personal digital assistant (PDA). The receiving module of the first and second electronic devices may each include a radio receiver or a television receiver.

In another embodiment of the present invention, an electronic apparatus for communication over a network includes a receiving module configured to receive a broadcast signal. A memory is arranged to store an application program and a user interface receives a user input. A processor is coupled to the memory to execute the application program and coupled to the receiver to change a configuration of the receiving module. The application program is arranged to change a configuration of the receiving module in response to the user input.

The application program may include pseudocode interpretable instructions and the processor arranged to interpret the instructions in a virtual machine. In one arrangement, the virtual machine includes a Java virtual machine and the application program can include a J2ME MIDlet.

The application program may be configured to receive a message over the network, extract a changed configuration from the message, and apply the changed configuration to the receiving module. In another arrangement, the application program is configured to send a message over the network, the message containing a current configuration of the receiving module.

In another arrangement of the apparatus, the processor is configured to extract an encoded data stream of the broadcast signal from the receiving module and the application program is configured to display the data stream on the user interface or store the data stream in the memory.

The above summary of the present invention is not intended to describe each illustrated embodiment or implementation of the present invention. This is the purpose of the figures and the associated discussion which follows.

BRIEF DESCRIPTION OF THE DRAWINGS

The invention is described in connection with the embodiments illustrated in the following diagrams.

DETAILED DESCRIPTION OF THE INVENTION

Figure 1:
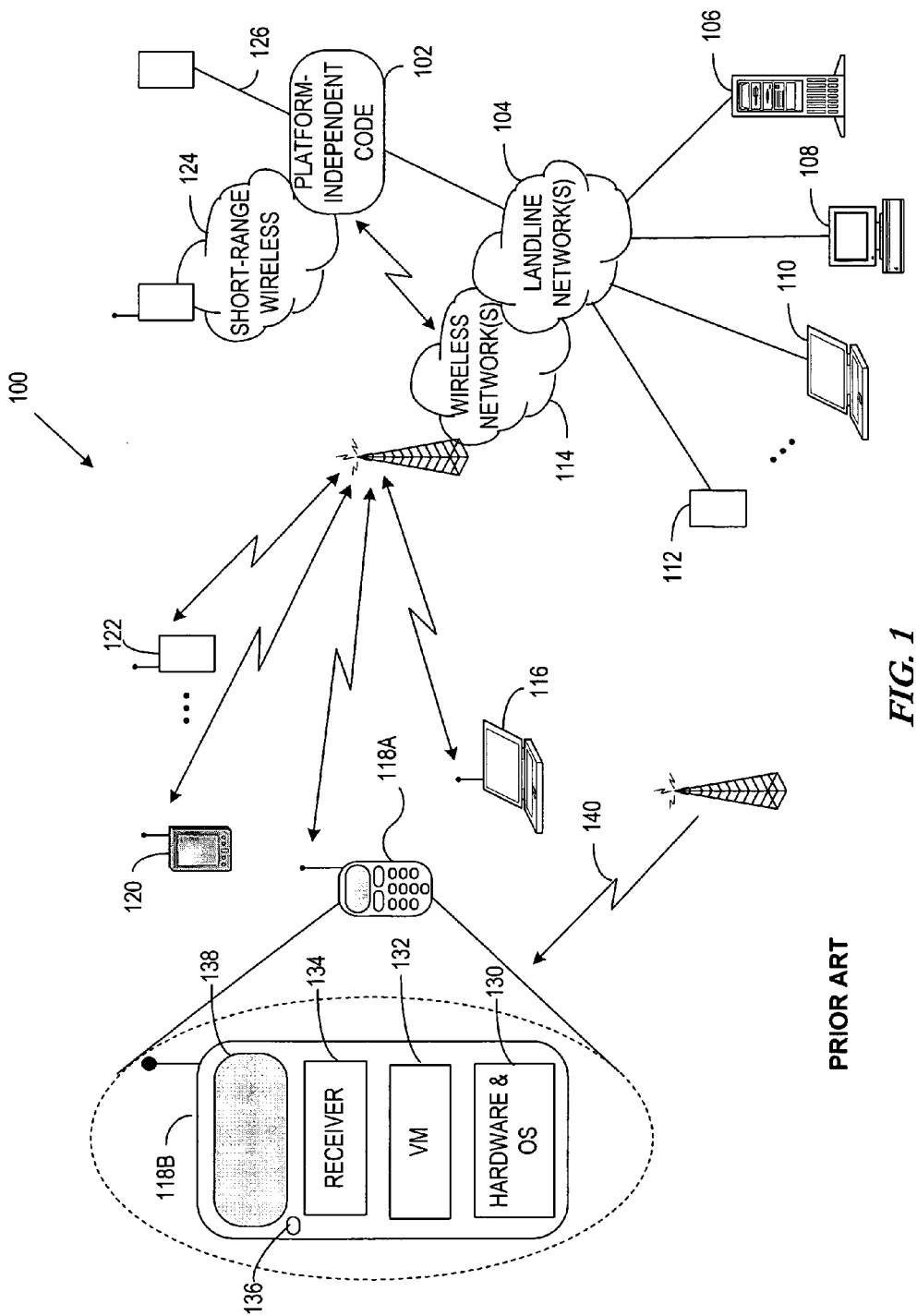
FIG. 1 illustrates a representative system environment in which the principles of the present invention may be employed.

In the following description of the exemplary embodiment, reference is made to the accompanying drawings which form a part hereof, and in which is shown by way of illustration various manners in which the invention may be practiced. It is to be understood that other embodiments may be utilized, as structural and operational changes may be made without departing from the scope of the present invention.

Generally, the present invention provides a method and apparatus for controlling an integrated receiving module in a portable communications device. In particular, one aspect of the present invention involves using a pseudocode interpreted language for cross platform compatibility. In another aspect, the receiving module control cooperates with the communications systems of the device to enable automated notification and control.

In general, communication devices include an electronic apparatus that can exchange data with other devices. The data can be in an analog or digital format, and can be transmitted through various communication mediums such as wire, optical fiber, or through the air as electromagnetic or light waves. Increasingly, communication devices include some sort of computing hardware such as a microprocessor. The growth of microprocessor controlled devices has been steadily growing in the field of mobile communication devices (cellular phones, PDAs, etc.). By and large, most mobile communications devices use microprocessors and can therefore be considered mobile computing devices.

Computing devices have a native platform, which includes the hardware and operating system of the devices. In some configurations, the devices may also be equipped with an actual or virtual machine running on top of the native platform to provide program translation services. As the name implies, a "virtual machine" generally has little or no hardware directly associated therewith, and is generally implemented in software. Such a virtual machine, however, may be partially implemented (or in the case of an actual machine, totally implemented) in hardware and/or a combination of hardware, firmware, and/or software. As used herein, a virtual machine is a platform-independent machine operable on program code and implemented using at least an interpreter.

A virtual machine acts as an interpreter program and is used to run an interpreted language. A virtual machine reads the source code and translates it on the fly into native machine instructions. The source is usually re-interpreted each time the code is executed. Most Unix scripting languages and Microsoft® Visual Basic work this way using text based source code files. Since the 1990's, however, pseudocode (p-code) interpreted languages have been become more widely used, mostly due to the adoption of the Java™ programming language. Python and Perl are other important languages that use p-code interpreters.

A p-code language is a hybrid language that uses both compilation and interpretation. Like a compiled language, the developer compiles a text based source code during development, except that the compiler output is not a machine code object, but a p-code object, such as a Java™ "class" file. The p-code object is loaded on to the computing device and the p-code is interpreted into native machine instructions by the virtual machine at run-time.

Although the need to compile the p-code may seem disadvantageous compared to pure interpreted languages, the approach has important advantages. P-code is a simpler and more compact representation of code than scripts or text. Therefore p-code interpreters can be made quite simple, small and fast. With modern run-time optimizations, p-code can run nearly as fast as a compiled binary. Further advantages provided by using p-code include the capability to obfuscate the code in the binary format to prevent tampering or reverse engineering of code. Also, unlike traditional binary code, the p-code compilation needs to be done only once. Thereafter, the p-code will run on any computing device that has the appropriate virtual machine.

Even with these advantages, p-code languages have been slower to migrate to mobile computing devices, mostly due to the memory and speed requirements of the virtual machine. A version of the Java™ known as the Java™ Micro Edition (J2ME) was developed to address these needs by running on a specialized version of the Java™ Virtual Machine (JVM) known as the K Virtual Machine (KVM). J2ME requires that a profile be defined to provide a framework for the class of devices for which an application is targeted. In particular, the Mobile Information Device Profile (MIDP) is particularly applicable to a class of devices to which the present invention may be utilized.

A MIDP application running in the KVM is sometimes known as a MIDlet. The use of MIDlets in J2ME allows designers of mobile devices to take advantage of writing extensible and portable code that will still have respectable performance on a mobile device.

For purposes of illustration, some concepts of the present invention will be described in terms of Java™ MIDlets. However, it will be readily apparent to those skilled in the art from the description provided herein that the present invention is equally applicable to analogous programming technologies (e.g. machine language, natively compiled code), whether existing currently or in the future. Therefore, references to Java™, J2ME, KVM, etc. are provided for purposes of illustration, and not of limitation.

FIG. 1 illustrates a representative system environment 100 in which the principles of the present invention may be employed. In one aspect of the invention, the functionality may be provided by platform-independent code 102, such as Java™ bytecodes. The representative system environment 100 illustrates that the platform-independent code 102 may be provided to target devices in any number of known manners. These manners include via a landline network(s) 104, which may include a Global Area Network (GAN) such as the Internet, one or more Wide Area Networks (WAN), Local Area Networks (LAN), and the like. Any computing device or other electronic device that supports platform-independent code 102 may be the target system that utilizes the present invention, such as servers 106, desktop computers 108 or workstations, laptop or other portable computers 110, or any other similar computing device capable of communicating via the network 104, as represented by generic device 112.

The code may be provided via one or more wireless networks 114, such as Global System for Mobile Communications (GSM), Universal Mobile Telecommunications System (UMTS), Personal Communications Service (PCS), Time Division Multiple Access (TDMA), Code Division Multiple Access (CDMA), or other mobile network transmission technology. Again, any computing device or other electronic device that supports platform-independent code 102 and can interface with a broadcast signal receiver may be the target system that utilizes the present invention, such as laptop or other portable computers 116, mobile phones 118A and other mobile communicators, Personal Digital Assistants (PDA) 120, or any other similar computing device capable of communicating via the wireless network 114, as represented by generic device 122.

The code 102 may be provided to devices using short-range wireless technologies 124, such as Bluetooth, Wireless Local Area Network (WLAN), infrared (IR), etc. The code 102 can also be distributed using direct wired connections, such as depicted by connection path 126. The code 102 can also be delivered using a broadcast signal 140. The present invention is applicable regardless of the manner in which code 102 is provided or distributed to the target devices.

An example of a target device that supports platform-independent code 102 is illustrated as the mobile phone 118B. The device 118B includes, for example, hardware and an operating system (OS) 130, and may include a virtual machine 132 for processing the platform-independent code 102. The present invention may be implemented as code running on the virtual machine 132, and in the case of Java bytecode, the virtual machine 132 represents a Java Virtual Machine (JVM).

A receiving module 134 receives a transmitted broadcast signal 140. The mobile phone 118B can be used to play the broadcast signal 140 through output devices such as the telephone speaker 136, or in the case of a video or TV signal, a video display 138. It is appreciated that any manner of integrated or external output device may be used to play the broadcast signal received at the device 118B, including a hands-free speaker, a headset, an external speaker connected to an output connector, etc.

Figure 2:
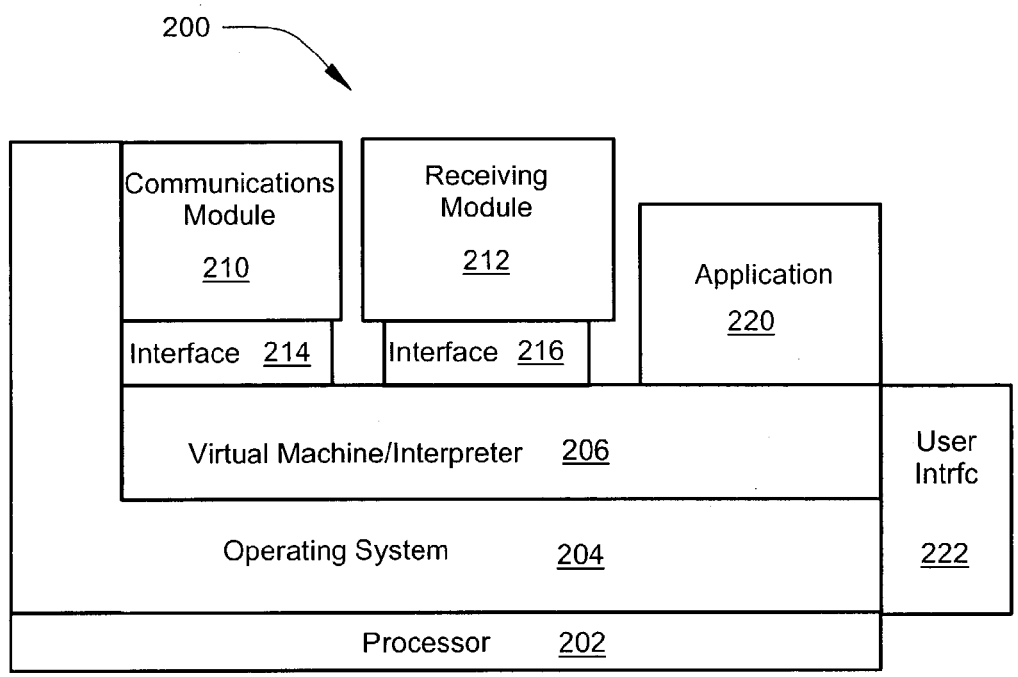
FIG. 2 is a component diagram showing interaction of modules on a target device in accordance with the present invention.

FIG. 2 is a component block diagram 200 that shows one arrangement of software and hardware components in a device according to the present invention. The device includes a processor 202 and an operating system 204. The operating system 204 provides the ability at least to control hardware devices and may schedule processes running on the processor 202.

A virtual machine 206 (sometimes referred to as an interpreter) may also be running on the operating system 204. For some devices, the virtual machine 206 may be a compact virtual machine, such as the KVM. In other applications, a more fully featured virtual machine such as the JVM may be used.

Also shown in FIG. 2 is a communications module 210 that performs two-way communications and a receiving module 212 that receives broadcast signals. The modules 210, 212 may include hardware, firmware, and software components, as well as any bus interfaces for communication with other modules. The modules 210, 212 may be separate circuits or may share some or all circuitry with each other. The modules 210, 212 may be integrated with the communications device or be in the form of attachable peripherals.

The communications module 210 generally allows two-way data communication over any wired or wireless media. This communication may be any analog or digital format, although the communications module 210 typically includes some sort of automated digital communications capability to send data to and from the processor 202.

The receiving module 212 receives a wired or wireless broadcast signal. This signal can be any modulation scheme (AM, FM, etc.) and can be a digital or analog format. The signal may be broadcast from a terrestrial, airborne, or spaceborne transmitter or be carried over wires such as coaxial cable. The broadcast signals may include secondary data encoded within the primary signal. Secondary data may be encoded using such schemes including Radio Data System (RDS), closed captioning, and digital audio broadcasting (DAB).

The communications and receiving modules 210, 212 may be accessed by the processor 202 of the device through drivers in the operating system 204. Interface libraries 214 and 216 may also be provided for access to modules 210 and 212, respectively. The interface libraries 214, 216 are designed for use by an application 220 running on the virtual machine 206, thereby providing an easy, standardized, and reusable way to programmatically communicate with the modules 210, 212.

An application 220 according to the present invention can be used to provide manual or automated control of the receiving module 212. The application 220 can communicate with a user interface 222 to show status and accept user inputs. The user interface 222 may be any combination of separate input and output devices (e.g. buttons, touchpads, thumbwheels, LCD displays, speakers, LEDs, etc.) or be an integrated device (e.g. touchscreen).

It is appreciated that software included in or with the operating system 204 can provide receiver control in a similar manner as the application 220. However, there are advantages to having a separate application 220 (such as a Java™ MIDlet) controlling the receiving module 212.

One advantage of using an application 220 for receiver control is that the application 220 can be added or removed by the user as desired. This allows the user to conserve memory space by removing unwanted software. The application 220 can be configured with as little or as much functionality as the user desires and can be easily patched or improved. Applications such as MIDlets can be transmitted over the communications module 210 or receiving interface 216, thereby allowing dynamic loading of the application 220 as needed.

Another advantage of using a MIDlet to control the receiving module 212 is that the module 212 can be interfaced with other Java™ MIDlets within the generic connection framework of Connected Limited Device Configuration (CLDC) which is defined as part of the J2ME architecture. The receiving module 212 can be addressed with a Uniform Resource Locator (URL) that allows the module 212 to be accessed from the connection framework. In this way, the MIDlet application 220 could also act as an interface to other applications on the same device or on the network.

Figure 3:
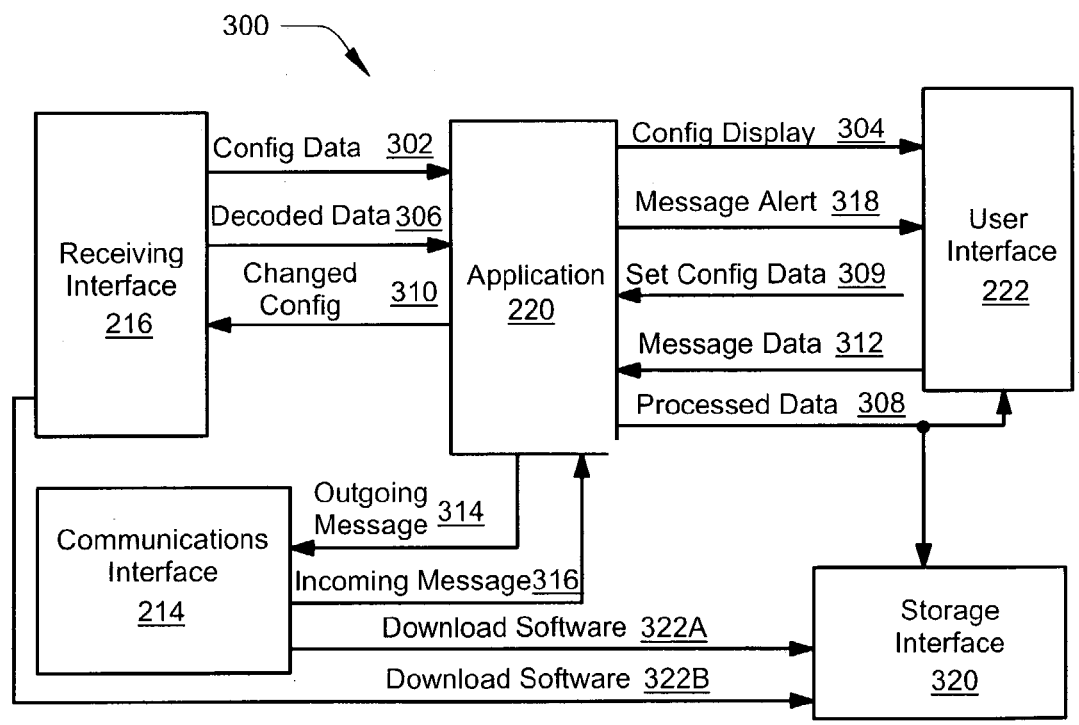
FIG. 3 is a data flow diagram showing communication between various modules on a target device in accordance with the present invention.

FIG. 3 is a data flow diagram 300 showing how the application 220 may send data between various software components in a device according to the present invention. The application 220 can get user configuration data 302 from the receiver interface 216 and use the configuration data 302 to form a configuration display 304 on the user interface 222. The configuration data 302 may include any data which can define a state of the receiving module, such as power, station identifier, station call letter, network name, frequency, modulation, encryption, signal processing, sensitivity, etc.

The receiving module 212 may be configured to decode data that is encoded in the broadcast signal and publish the decoded data 306 from the receiver interface 216. The application 220 can receive and perform processing on the data, and then output the processed data 308 to the user interface 222 for display, or to a storage interface 320. The storage interface 320 provides persistent data storage and retrieval for data, thus allowing the user to store processed data 308 for access at a later time.

The application 220 is able to set changed configuration data 310 at the receiver interface 216. Setting the changed configured data 310 has the effect of changing the receiver state (e.g. changing channels, turning off and on, etc.) The changed configuration data 310 may be the result of manipulating configuration data 309 at the user interface 222, or may be obtained from some automated event. For example, an internal timer can be used to turn the receiving module 212 on at a pre-determined time.

In some situations, a user may desire to inform a second user who has a similar device about a broadcasted event. In one arrangement, the application 220 can prepare outgoing message data 312 based on the receiving module configuration data 302. The application 220 uses this message data 312 to format an outgoing message 314 to be sent to the communications interface 214. The outgoing message 314 may include binary or text messages of any appropriate format. For example, the outgoing message 314 can be a Short Message Service (SMS) message, as SMS is widely implemented in mobile devices.

The second user with a similarly capable communications device receives the outgoing message 314 as an incoming message 316. The application 220 can parse the incoming message 316 and send a message alert 318 to the user interface 222. The message alert 318 can be communicated to the user by standard means such as vibration, sound, showing an icon, flashing a light or LED, etc.

The message alert 318 may include data such as the identity of the sender and attached text explaining why the message 316 was sent. If the second user desires to accept the action shown in the message alert 318, the application 220 can then automatically set the receiving module's state using a changed configuration data 310 extracted from the incoming message 316.

In another method of controlling the receiving module 212, the application 220 can monitor the decoded data 306 sent from the broadcast. The decoded data 306 may include text messages or commentary such as that used in closed captioning. The application 220 can be configured to parse and monitor the decoded data 306, and form a changed configuration data 310 based on some event. For example, the application 220 could be used to recognize commercials and mute an audio output of the receiving module 212.

As indicated in FIG. 3, the communications interface 214 can be used to load the application 220 as a software download 322A into memory through a storage interface 320. It is also possible for the receiving interface 216 to receive a download 322B when accessing a broadcast that includes encoded data. The storage interface 320 can place the application 220 in an appropriate data storage device such as RAM, disk drive, etc. A similar procedure can be used to update or delete the application 220 from memory. It is appreciated that the functions of adding, deleting, and replacing applications such as MIDlets are implementation specific and are usually included as part of the operating system 204 and/or virtual machine 206.

Figure 4:
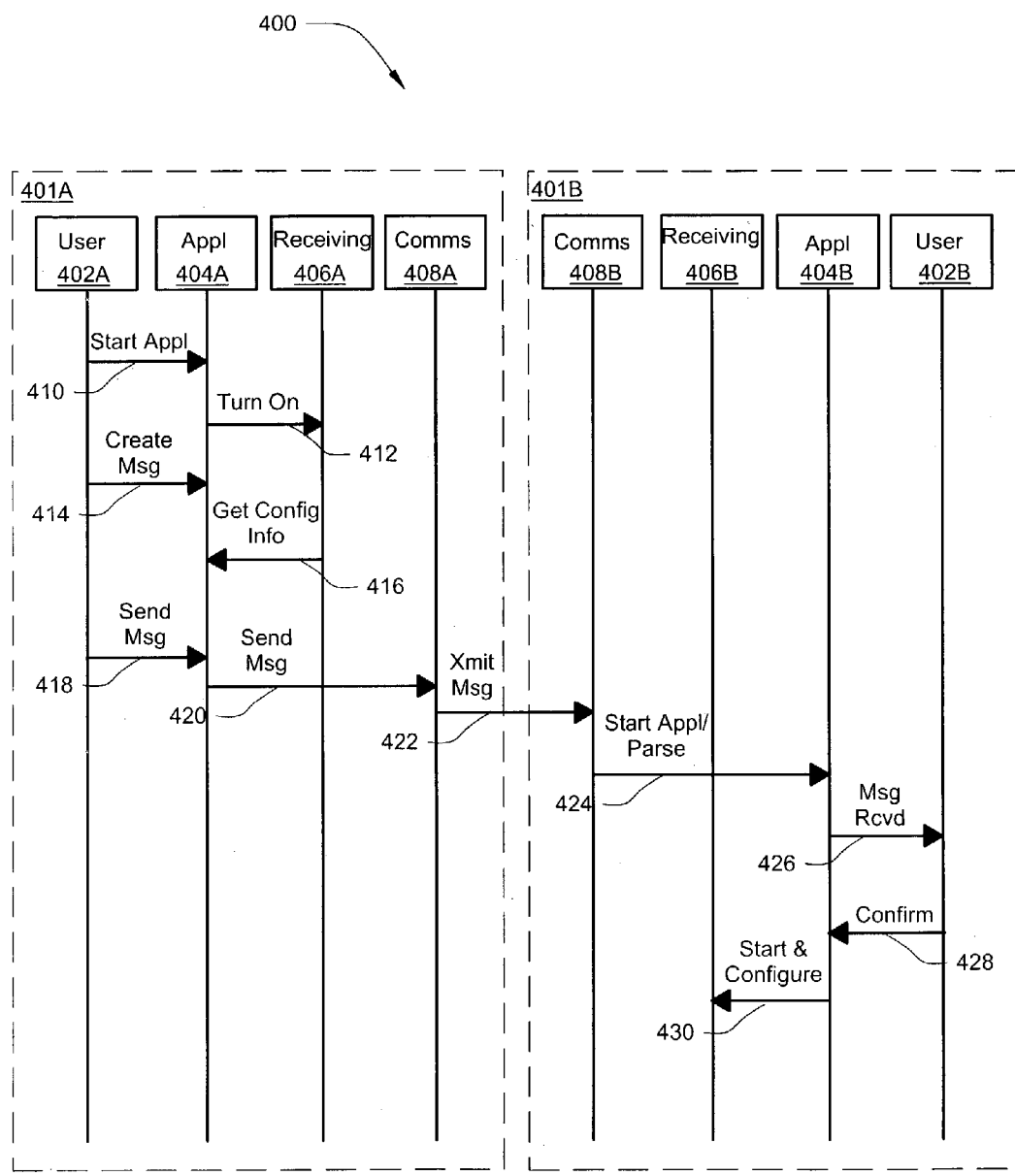
FIG. 4 is a time-line system scenario showing peer-to-peer communication between devices on a system in accordance with the present invention.

FIG. 4 includes an event diagram 400 showing the steps involved in a peer-to-peer message exchange that allows automated receiving module control according to an embodiment of the present invention. The peer devices 401A and 401B can be any manner of device as described herein. Both devices 401A, 401B are peers at least in the sense that they have active users 402A and 402B, respectively.

The message exchange begins at step 410, where the user 402A starts the application 404A. The application 404A may turn on the receiving module 406A at step 412 if the module 406A is not already on. The application 404A may also be started automatically in ways such as in response to an internal timer, an incoming message, or some other internal or external event. While the application is running, the user 402A may perform other configuration actions (not shown) to set a state of the receiving module 406A, such as tuning to a particular station.

While listening to the broadcast, the user 402A may wish to inform another user 402B of a currently playing event, such as a song or news story. The user 402A creates a message at step 414 as an outgoing notification message. The application 404A gets configuration data at step 416 to automatically fill in a portion of the message. The user 402A can then modify and confirm the message before sending the message at step 418. At step 420, the application 404A sends the message through the communications module 408A.

The message can be transmitted from device 401A to device 401B at step 422 using any appropriate direct or indirect communication method. The communications module 408B receives the incoming message. The system may be configured to recognize the incoming message and start the application 404B if not already running. The communications module 408B sends the message to the application 404B for parsing at step 424. The application 404B informs user 402B of the incoming message at step 426 and gives the user the option of accepting the action contained in the message. The user 402B confirms at step 428 and the application 404B then sets the receiving module 406B to the appropriate state at step 430.

Figure 5:
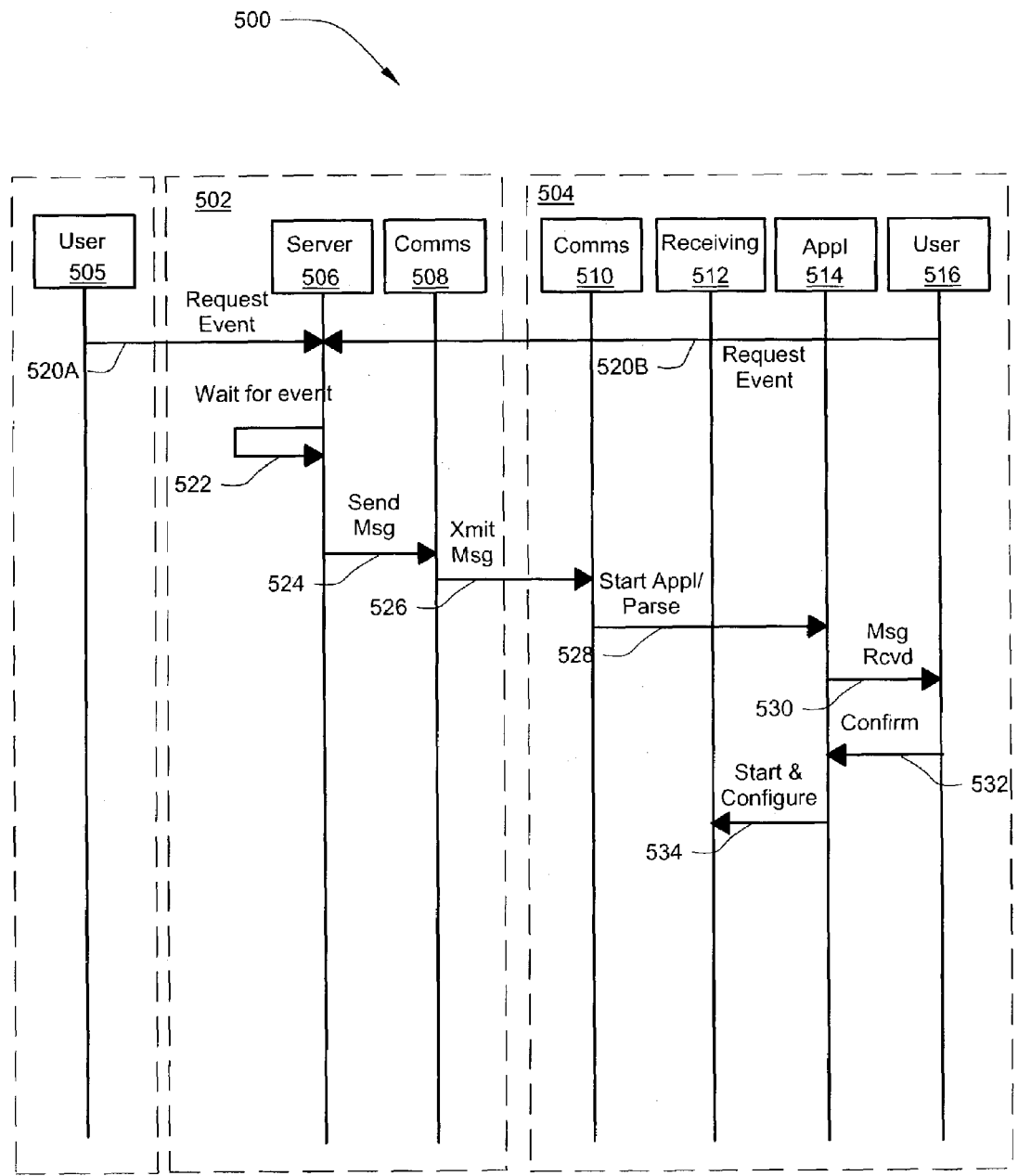
FIG. 5 is a time-line system scenario showing device-to-node communication between devices on a system in accordance with the present invention.

In FIG. 5, an event diagram 500 outlining a similar scenario to that of FIG. 4 is shown. In FIG. 5, however, the message is sent from a notification node 502. The node 502 can be any device that is remotely accessible and acts as an automated server (e.g. no interactions with a local user are required). The node 502 contains a server module 506 that is configured to send out messages to be received by a device 504 configured according to the present invention.

Either the user 516 of the receiving device 504 or another user 505 may request notification of an event at steps 520B, 520A. The requests 520A, 520B may be accomplished through any method known in the art. Methods of requesting notification from the node 502 may include accessing a touch tone dial-up system, sending an SMS message, browsing a web site, phoning a human operator, sending a postcard or e-mail request, etc. The users 505, 516 can request a notification for any event contained in a local broadcast.

Request events 520A, 520B sent to the node 502 may include notification parameters based on time, place, and/or content. For example, the users 505, 516 could request a notification whenever certain events are being broadcast. Such events may include major news stories, songs, shows, weather alerts, etc. The user 505 who does not necessarily have a device 504 may want to inform one or more users of events, either immediately or in the future. For example, a taxi dispatcher may want to send a message to have all drivers automatically tune their device radios to hear a traffic accident report.

The events for activating the device 504 can be automatically generated based on the user's location. For example, the device 504 could be configured to automatically inform the node 502 when a significant change to the user's location has occurred. The node 502 can then respond with a message reconfiguring the receiving module 512 to receive local station(s) playing a set of predetermined program content.

Once the user 516 has established a notification event at the node 502, the server module 506 waits for the requested event at step 522. When the event occurs, the server module 506 sends a message to the communications module 508 at step 524. At step 526, the message is transmitted from the node 502 to the device 504. Similar to the procedure shown in FIG. 4, the message is parsed by the application 514 at step 528, the user 516 is notified at step 530, the user 516 confirms at step 532, and the application 514 configures the receiving module 512 at step 534. If the event is targeted for multiple users 516, steps 526–534 may be repeated for each user 516. Alternately, the server module 506 may be able to broadcast the event to multiple devices 504, in which case step 526 would occur once and steps 528–534 would be repeated for each user 516.

Using the description provided herein, the invention may be implemented as a machine, process, or article of manufacture by using standard programming and/or engineering techniques to produce programming software, firmware, hardware or any combination thereof. Any resulting program(s), having computer-readable program code, may be embodied on one or more computer-usable media such as resident memory devices, smart cards or other removable memory devices, or transmitting devices, thereby making a computer program product or article of manufacture according to the invention. As such, "computer readable mediums" as used herein are intended to encompass a computer program that exists permanently or temporarily on any computer-usable medium or in any transmitting medium which transmits such a program.

As indicated above, memory/storage devices include, but are not limited to, disks, optical disks, removable memory devices such as smart cards, SIMs, WIMs, semiconductor memories such as RAM, ROM, PROMS, etc. Communication mediums include, but are not limited to, communications via wireless/radio wave communication networks, the Internet, intranets, telephone/modem-based network communication, hard-wired/cabled communication network, satellite communication, and other stationary or mobile network systems/communication links.

From the description provided herein, those skilled in the art are readily able to combine software created as described with appropriate general purpose or special purpose computer hardware to create a mobile computer system and/or computer subcomponents embodying the invention, and to create a mobile computer system and/or computer subcomponents for carrying out the method of the invention.

The foregoing description of the exemplary embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

What is claimed is:

1. A method for controlling a broadcast receiving module on a communications device, comprising:
retrieving an operational configuration of the receiving module via an application program running in a virtual machine on the communications device to determine a state of the receiving module;
applying a user input to the application program to create a changed configuration of the receiving module;

applying the changed configuration to the receiving module via the application program to control the receiving module;
creating a message from an operational configuration of the receiving module; and
sending the message over a communications link of the communications device.

2. The method of claim 1, further comprising retrieving a decoded message from the broadcast as input to the application program.

3. The method of claim 2, further comprising displaying the decoded message in a display of the communications device.

4. The method of claim 2, further comprising storing the decoded message in a data storage module of the communications device.

5. The method of claim 1, wherein the virtual machine comprises a Java virtual machine.

6. The method of claim 5, wherein the application program comprises a J2ME MIDlet.

7. The method of claim 1, wherein controlling the receiving module comprises changing at least one of a frequency and an on-off state of the receiving module.

8. The method of claim 1, wherein changing a state of controlling the receiving module comprises changing a modulation format of the receiving module.

9. A method for controlling a broadcast receiving module on a communications device, comprising:
retrieving an operational configuration of the receiving module via an application program running in a virtual machine on the communications device to determine a state of the receiving module;
applying a user input to the application program to create a changed configuration of the receiving module;
applying the changed configuration to the receiving module via the application program to control the receiving module;
receiving a message containing a modified configuration of the receiving module from a communications link of the communications device; and
applying the modified configuration as input to the application program to change the state of the receiving module.

10. The method of claim 9, further comprising retrieving a decoded message from the broadcast as input to the application program.

11. The method of claim 10, further comprising displaying the decoded message in a display of the communications device.

12. The method of claim 10, further comprising storing the decoded message in a data storage module of the communications device.

13. The method of claim 9, wherein the virtual machine comprises a Java virtual machine.

14. The method of claim 13, wherein the application program comprises a J2ME MIDlet.

15. The method of claim 9, wherein controlling the receiving module comprises changing at least one of a frequency and an on-off state of the receiving module.

16. The method of claim 9, wherein changing a state of controlling the receiving module comprises changing a modulation format of the receiving module.

17. A method for controlling a broadcast receiving module on a communications device, comprising:
receiving a message containing a configuration of the receiving module from a communications link of the communications device;
applying the configuration to the receiving module via an application program running in a virtual machine on the communications device to control the receiving module;
retrieving an operational parameter of the receiving module to determine a state of the receiving module;
creating a message from the retrieved operational parameter of the receiving module; and
sending the message over the communications link of the communications device.

18. The method of claim 17, further comprising alerting a user of the communications device to confirm the changed configuration before the receiving module.

19. The method of claim 17, wherein controlling the receiving module comprises changing at least one of a frequency and an on-off state of the receiving module.

20. An electronic apparatus for communication over a network, comprising:
a receiving module configured to receive a broadcast signal;
a memory arranged to store an application program and a Java virtual machine, the application program including pseudocode interpretable instructions;
a processor coupled to the memory to execute the application program via the Java virtual machine and coupled to the receiver to control the receiving module;
a user interface arranged to receive a user input; and
wherein the application program is arranged to control the receiving module in response to the user input.

21. The electronic apparatus of claim 20, wherein the application program comprises a J2ME MIDlet.

22. The electronic apparatus of claim 20, wherein the application program is configured to receive a message over the network, extract a changed configuration from the message and apply the changed configuration to the receiving module.

23. The electronic apparatus of claim 20, wherein the application program is configured to send a message over the network, the message containing a current configuration of the receiving module.

24. The electronic apparatus of claim 20, wherein the processor is configured to extract an encoded data stream of the broadcast signal from the receiving module and the application program is configured to display the data stream on the user interface.

25. The electronic apparatus of claim 20, wherein the processor is configured to extract an encoded data stream of the broadcast signal from the receiving module and the application program is configured to store the data stream in the memory.

26. A computer-readable medium for facilitating control of a broadcast receiving module associated with a computing arrangement, the computer readable medium configured with instructions for causing the computing arrangement to perform steps comprising:
receiving a message containing a configuration of the receiving module via a communications link of the computing arrangement; and
applying the configuration to the broadcast receiving module via a Java J2ME MIDlet running in a virtual machine on the computing arrangement to control the broadcast receiving module.

27. The computer-readable medium of claim 26, wherein the steps further comprise alerting a user of the computing arrangement to confirm the changed configuration before changing the state of the broadcast receiving module.

28. The computer-readable medium of claim 26, wherein changing the state of the broadcast receiving module comprises changing at least one of a frequency and an on-off state of the broadcast receiving module.

29. The computer-readable medium of claim 26, wherein the communications link of the computing arrangement comprises a wireless communications link.

* * * * *